Sept. 10, 1929.   C. W. HOLMQUIST   1,727,644
VALVE STRUCTURE
Filed Sept. 10, 1925   2 Sheets-Sheet 1
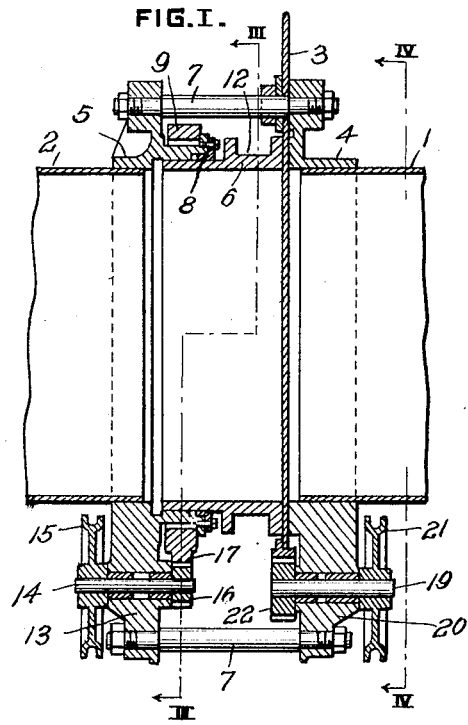
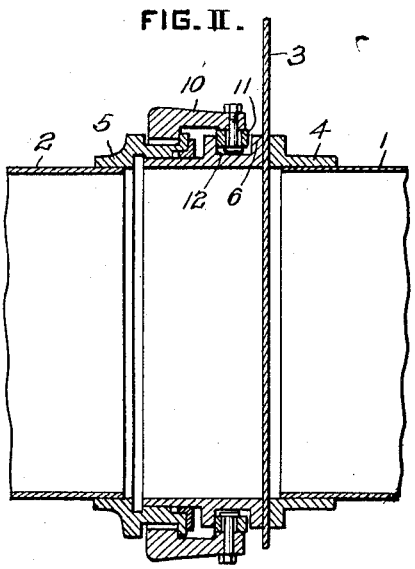
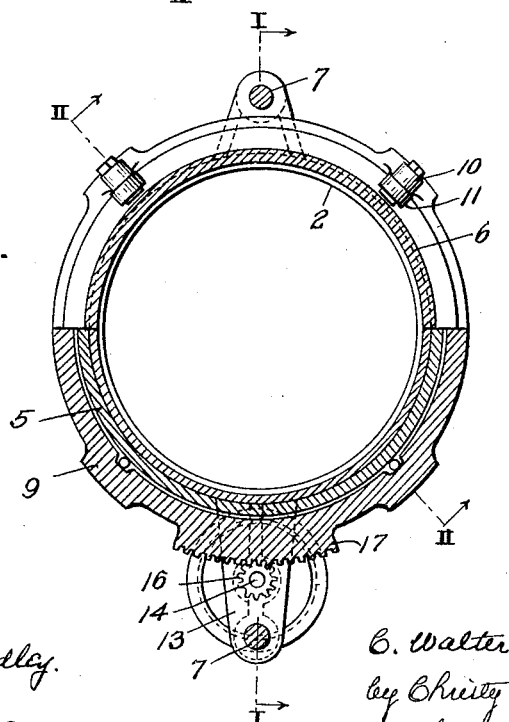
WITNESSES
INVENTOR
C. Walter Holmquist
by Christy and Christy
his attorneys Sept. 10, 1929.　　　C. W. HOLMQUIST　　　1,727,644
VALVE STRUCTURE
Filed Sept. 10, 1925　　　2 Sheets-Sheet 2
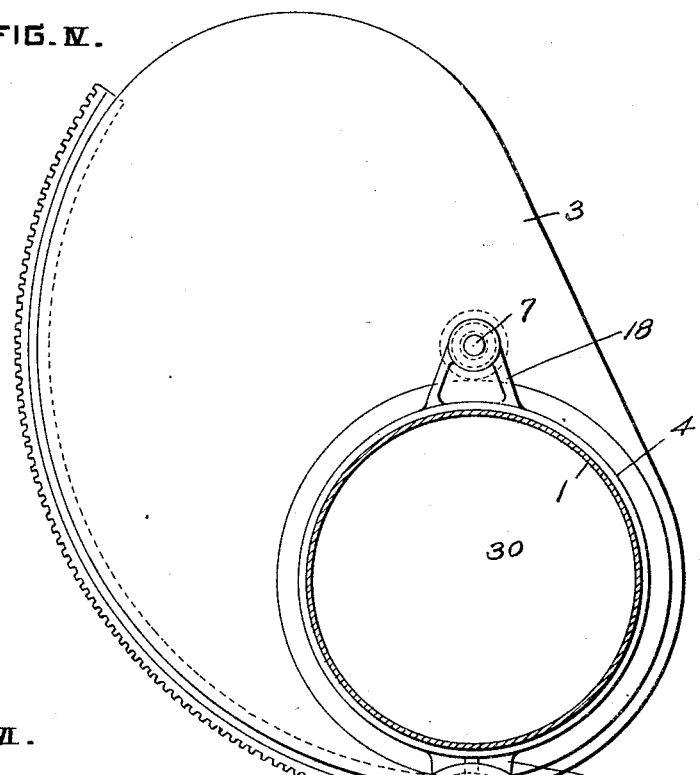
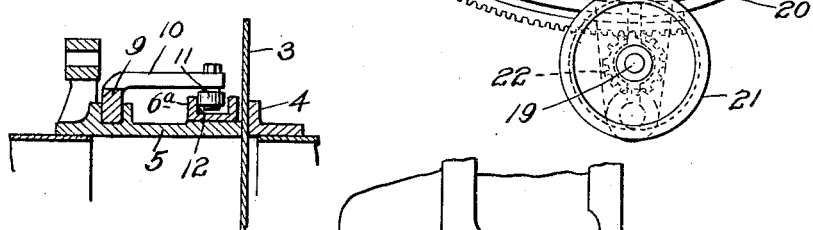
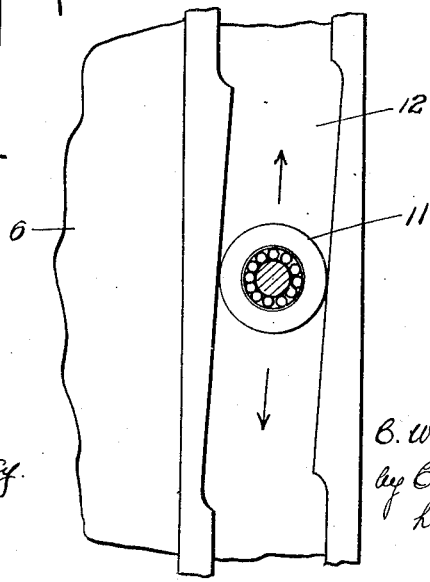
WITNESSES
INVENTOR Patented Sept. 10, 1929.

1,727,644

UNITED STATES PATENT OFFICE.

CARL WALTER HOLMQUIST, OF WOODLAWN, PENNSYLVANIA, ASSIGNOR, BY MESNE ASSIGNMENTS, TO ARTHUR G. McKEE & COMPANY, OF CLEVELAND, OHIO, A CORPORATION OF DELAWARE.

VALVE STRUCTURE.

Application filed September 10, 1925. Serial No. 55,581.

My invention relates to improvements in valve structure, and finds practical application in the structure which is termed the goggle valve of a blast furnace.

The hot gases which come from a blast furnace are carried off, through a pipe, to purification chambers, and ultimately to furnace burners. In this conduit pipe, and adjacent the furnace, the goggle valve is arranged. Its function is alternately to shut off and to leave unimpeded the flow of gases, and it is necessary, as furnace operation progresses, to shift the valve to and fro between its two positions. Not only must the valve be susceptible to shifting, it must be susceptible to being made tight in each position, that there shall be no substantial leakage of flame and hot gases at the point where it stands.

As blast furnaces ordinarily are constructed and operated, the goggle valve is a plate with a hole in it, extending in a plane transverse to the line of flow, and the conduit is severed at the point where the plate is arranged, and the ends are spaced apart, and in the space so afforded the valve plate is set. It is susceptible to shifting in the plane of its extent, so that in one position the hole through the plate is aligned with the bore of the conduit, and in the alternate position an imperforate portion of the plate extends across the bore and cuts off the flow. There is a certain amount of relative movement between the conductor ends, sufficient alternately to allow plate-shifting and to engage the plate in substantially gas-tight abutment. Bolts are provided, by which the conductor ends may be drawn to clamping engagement upon opposite sides of the plate. When the bolts are loosened, the plate may be shifted. The loosening and tightening of the bolts, and the shifting of the plate to and fro, are steps which have to be taken at recurrent intervals, as furnace operation progresses. If, as commonly is the case, workmen armed with wrenches and levers have to do this work, they are exposed to arduous and dangerous conditions.

My invention consists in a valve structure operable from afar, to accomplish the ends described, and a structure such in its mechanical parts and in the principles involved in the moving of those parts, that it is well adapted to service.

In the accompanying drawings, a valve structure in which my invention is embodied, is shown. Figs. I and II are views in axial section through the adjacent conductor ends and through the valve structure arranged between them, and Fig. III is a view in transverse section. The planes of section of Figs. I and II are in Fig. III indicated by the dotted lines I—I and II—II; the plane of section of Fig. III (a broken plane) is indicated in Fig. I by the stepped line III—III. Figs. I and II show the valve in closed position. Fig. IV is a view in transverse section, on the plane indicated at IV—IV, Fig. I, and in this figure the valve is shown to be standing in open position. Fig. V is a diagrammatic view to larger scale, showing in elevation a detail of structure. Figure VI illustrates a modification.

In these drawings the reference numerals 1 and 2 indicate the adjacent lengths of conductor, and between these conductor ends the valve plate 3 extends.

The conductor ends do not immediately engage the valve plate, but they are provided with specially shaped and proportioned members by which immediate engagement is made. The conductor end 1 carries rigidly a one-piece ring 4, and the conductor end 2 carries a compound structure. This compound structure includes a ring 5 rigidly mounted on the conductor end 2, and a second ring 6 telescopic upon ring 5. The two rigid rings 4 and 5 are bolted together, as by bolts 7; a suitable gasket 8 insures a tight seam between ring 6 and ring 5 upon which it is telescopically movable; the opposing ends of rings 4 and 6 immediately engage valve plate 3, and make clamping and substantially gas-tight engagement upon it.

Means are provided for moving ring 6 telescopically, to and from valve-engaging position, and means are provided for shifting the disengaged valve, and in such means my invention is more particularly found.

The means for shifting the ring 6 telescopically are found in a ring 9 rotatable externally upon ring 5. Ring 9 may, as the drawings show, be mounted upon anti-friction bearings. Ring 9 is provided with a suitable number of arms 10 which, at their ends (equipped, preferably, with anti-friction rollers 11) enter a channel 12 which is formed externally upon ring 6. The channel last alluded to appears in cross-section, in Figs. I and II, but its particular structure is made more fully apparent in Fig. V. There it will be seen that the opposite walls of the channel are obliquely arranged with respect to the direction of telescopic movement, and that the rollers 11 are arranged effectively to engage, now one wall and now the opposite wall of the channel. As the ring 9 is turned first in one direction and then in the other, the rollers are caused to advance in the approximate (but only approximate) direction in which the channel extends. They bear upon the obliquely disposed walls of channel 12 and thus effect the shifting of ring 6 to and from plate-clamping position. The number of arms 10 is important, only in so far as to insure strength and proper distribution of operating forces; the drawings indicate four such arms, spaced at quadrant points around the structure, and that number is adequate.

In an extension 13 from ring 5 a shaft 14 is rotatably borne. This shaft extends in parallelism with the axis of the conductor. It is provided with a pulley 15, through which it may be rotated from a distance by means of a rope or the like. The shaft 14 carries a pinion 16 and ring 9 is provided with a gear section 17, concentric with the ring itself and meshed with pinion 16. Manifestly, rotation of shaft 14 may by the means described effect the shifting of ring 6 telescopically upon ring 5, alternately to clamp plate 3 upon ring 4, or to release the plate from such clamping engagement.

The valve plate 3 is best shown in Fig. IV. It will there be seen to be of essentially sector shape, and to be mounted at its center for pivotal turning in an extension 18 from ring 4. Conveniently, and as here shown, one of the connecting bolts 7 is made the post upon which plate 3 pivotally turns. The radius of the sector to which plate 3 is formed exceeds the distance from the point of pivoting, diametrically across ring 4.

The means for rotating valve plate 3 are found in a shaft 19, rotatably borne in an extension 20 from ring 4. The shaft 19 extends, also, in parallelism with the axis of the conveyor; it also carries an operating pulley wheel 21, and a pinion 22. The pinion 22 meshes with gear teeth formed in the circumferential edge of the sector-shaped valve plate 3. Manifestly, the valve plate being free to turn, the intelligent turning of shaft 19 will effect shifting of the valve plate. The valve plate is provided with a circular orifice 30 of equal diameter with the conduit, and the plate is of such extent that within the range of pivotal shifting either the orifice may be brought to registry with the conductor ends, or an imperforate portion of the web of the plate may extend across the space and completely cut off flow through the conductor.

In operation, the parts being in the positions shown in Fig. I, and the flow of gases being cut off, and the seam between plate 3 and ring 4 being tight, when it is desired to open the conduit for gaseous flow, shaft 14 first is turned, and by its turning ring 6 is withdrawn in right-to-left direction, and plate 3 freed. Shaft 19 is then in sequence turned, and by its turning plate 3 is shifted (clockwise, as seen in Fig. IV) until the plate comes to the position shown in Fig. IV. Shaft 14 is then oppositely turned and ring 6 is caused to advance again, to clamp plate 3 in its new position between itself and ring 4. By similar and manifest procedure the open valve may be closed again.

It is apparent that valve operation may be effected from a distance, and attendants need not be exposed to dangerous conditions. The structure is simple, not easily susceptible to getting out of order, and it is most easily operated. It is further apparent that the conductor ends themselves may be rigidly mounted; no small relative movement between them is required to make my valve structure effective.

Fig. VI shows a modification in the proportions of the parts described, and an arrangement somewhat different, and in certain respects better. The ring 5 in this case extends, when the parts are assembled, to immediate proximity to plate 3. The ring 6$^a$ is of larger diameter and telescopes upon the outer surface of ring 5. In this arrangement ring 6$^a$ does not constitute any substantial part of the gas conduit; its clamping function, however, remains unchanged.

I claim as my invention:

In a valve structure the combination of two conductor ends aligned upon a common axis and spaced apart, a valve plate movable in a transverse plane between the conductor ends, two rings borne by one of the conductor ends, one of the said rings being rotatable and the other being telescopic upon the conductor end which bears them, the telescopic ring being provided with a circumferentially extending channel with opposite walls obliquely inclined to the common axis of the conductor ends and the rotatable ring being provided with a finger which when the parts are assembled enters such channel.

In testimony whereof I have hereunto set my hand.

C. WALTER HOLMQUIST.